(12) United States Patent
Almgren et al.

(10) Patent No.: US 6,169,985 B1
(45) Date of Patent: Jan. 2, 2001

(54) METHOD AND APPARATUS FOR DETERMINING A SET OF DATABASE ENTRIES

(75) Inventors: Jonas Almgren, Menlo Park; Gregory Vincent Walsh, Cupertino; Eliot Leonard Wegbreit, Palo Alto, all of CA (US)

(73) Assignee: Epiphany, Inc., San Mateo, CA (US)

( * ) Notice: Under 35 U.S.C. 154(b), the term of this patent shall be extended for 0 days.

(21) Appl. No.: 09/087,518

(22) Filed: May 29, 1998

(51) Int. Cl.$^7$ .................................................. G06F 17/30
(52) U.S. Cl. ................................. 707/4; 707/5; 345/968
(58) Field of Search ................. 707/4, 5, 1, 2, 707/3; 345/968, 326, 339

(56) References Cited

U.S. PATENT DOCUMENTS

| | | | |
|---|---|---|---|
| 5,091,852 | * | 2/1992 | Tsuchida et al. . |
| 5,515,488 | * | 5/1996 | Hoppe et al. ........................ 345/440 |
| 5,721,900 | * | 2/1998 | Banning et al. ......................... 707/4 |
| 5,721,901 | * | 2/1998 | Banning et al. ..................... 395/604 |
| 5,787,411 | * | 7/1998 | Groff et al. .............................. 707/2 |
| 5,842,203 | * | 11/1998 | D'Elena et al. ......................... 707/4 |
| 5,893,079 | * | 4/1999 | Cwenar .................................. 705/36 |
| 5,894,311 | * | 4/1999 | Jackson ................................ 345/440 |
| 5,946,692 | * | 8/1999 | Faloutsos et al. .................... 707/101 |
| 5,963,938 | * | 10/1999 | Wilson et al. ............................ 707/4 |
| 5,995,957 | * | 11/1999 | Beavin et al. ........................... 707/2 |
| 6,006,220 | * | 12/1999 | Haderle et al. .......................... 707/4 |

OTHER PUBLICATIONS

Wang et al, "Selectivity Estimation in the Presence of Aplhanumeric Correlations", IEEE 1997, pp. 169–180.*

Kimball, R., "The Data Warehouse Toolkit", (1996) John–Wiley & Sons, Inc., 388 pages (includes CD ROM).

Chawathe, S. et al., "Change Detection in Hierarchically Structured Information", *SIGMOD Record*, vol. 25, No. 2, Jun. 1996, pp. 493–504.

Chawathe, S. et al., "Meaninfgul Change Detection in Structured Data", *Proceedings of the 1997 ACM SIGMOD International Conference*, ACM Press, 1997, pp. 26–37.

Labio, W. et al., "Efficient Snapshot Differential Algorithms for Data Warehousing", Department of Computer Science, Stanford University, (1996), pp. 1–13.

Wiener, J. et al., "A System Prototype for Warehouse View Maintenance", *The Workshop on Materialized Views*, pp. 26–33, Montreal, Canada, Jun. 1996.

Kawaguchi, A. et al., "Concurrency Control Theory for Deferred Materialized Views", Database Theory–ICDT '97, *Proceedings of the 6th International Conference*, Delphi, Greece, Jan. 1997, pp. 306–320.

Zhuge, Y. et al., "Consistency Algorithms for Multi–Source Warehouse View Maintenance", *Distributed and Parallel Databases*, vol. 6, pp. 7–40 (1998), Kluwer Academic Publishers.

(List continued on next page.)

*Primary Examiner*—Thomas G. Black
*Assistant Examiner*—Uyen Le
(74) *Attorney, Agent, or Firm*—Wilson, Sonsini, Goodrich & Rosati

(57) ABSTRACT

A method of defining in a computer system a subset of entries in a database is described. The subset is defined by a query. The method includes displaying an interface having a number of criteria description locations. The criteria description locations being positioned in rows where each row has one or more columns. The method also includes creating a criteria description in the interface. The criteria description corresponds to criteria, where the criteria define a corresponding subset of the database. Importantly, the relative location of the criteria description in the user interface determines how the criteria contribute to the selectivity of the query.

29 Claims, 16 Drawing Sheets

OTHER PUBLICATIONS

Zhuge, Y. et al., "View Maintenance in a Warehousing Environment", *SIGMOD Record*, vol. 24, No. 2, Jun. 1995, pp. 315–327.

Widom, J., "Research Problems in Data Warehousing", *Proc. of 4th Int'1 Conference on Information and Knowledge Management* (*CIKM*), Nov. 1995, 6 pages.

Yang, J. et al., "Maintaining Temporal Views Over Non–Historical Information Sources For Data Warehousing", *Advances in Database Technology—EDBT '98*, Proceedings of the 6th International Conference on Extending Database Technology, Valencia, Spain, Mar. 1998, pp. 389–403.

Quass, D., "Maintenance Expressions for Views with Aggregation", Proceedings of the 21st International Conference on Very Large Data Bases, IEEE, Zurich, Switzerland, (Sep. 1995), 9 pages.

Mumick, I. et al, "Maintenance of Data Cubes and Summary Tables in a Warehouse", Proceedings of the 1997 ACM SIGMOD International Conference, ACM Press, 1997, pp. 100–111.

Huyn, N., "Multiple–View Self–Maintenance in Data Warehousing Environments", Proceedings of the 23rd International Conference on Very Large Data Bases, IEEE, (1997), pp. 26–35.

Quass, D. et al., "Making Views Self–Maintainable for Data Warehousing", Proceedings of the Fourth International Conference on Parallel and Distrubuted Information Systems , IEEE, Dec. 1996, pp. 158–169.

Quass, D. et al., "On–Line Warehouse View Maintenance", Proceedings of the 1997 ACM SIGMOD International Conference, ACM Press, 1997, pp. 393–404.

Gupta, H., "Selection of Views to Materialize in a Data Warehouse", Database Theory—ICDT '97, Proceedings of the 6th International Conference, Delphi, Greece, Jan. 1997, pp. 98–112.

Harinarayan, V. et al., "Implementing Data Cubes Efficiently", *SIGMOD Record*, vol. 25, No. 2, Jun. 1996, pp. 205–216.

Gupta, H. et al, "Index Selection for OLAP", IEEE Paper No. 1063–6382/97, *IEEE* (1997), pp. 208–219.

Labio, W. et al., "Physical Database Design for Data Warehouses", IEEE Paper No. 1063–6382/97, *IEEE* (1997), pp. 277–288.

Gupta, A. et al., "Aggregate–Query Processing in Data Warehousing Environments", *Proceedings of the 21st VLDB Conference*, Zurich, Switzerland, Sep. 1995, pp. 358–369.

O'Neill, P. et al., "Improved Query Performance with Variant Indexes", Proceedings of the 1997 ACM SIGMOD International Conference, ACM Press, 1997, pp. 38–49.

McAlpine, G. et al., "Integrated Information Retrieval in a Knowledge Worker Support System", Proc. of the Intl. Conf. on Research Development In Information Retrieval (SIGIR), Cambridge, MA, Jun. 25–28, 1989, Conf. 12, pp. 48–57.

Tsuda, K. et al, "IconicBrowser: An Iconic Retrieval System for Object–Oriented Databases", Proc. of the IEEE Workshop on Visual Languages, Oct. 4, 1989, pp. 130–137.

"Multiple Selection List Presentation Aids Complex Search", IBM Technical Disclosure Bulletin, vol. 36, No. 10, Oct. 1993, pp. 317–318.

* cited by examiner

1300 Criteria Treatment Display Window

1500 Criteria Export Window

METHOD AND APPARATUS FOR DETERMINING A SET OF DATABASE ENTRIES

REFERENCES TO RELATED APPLICATION

U.S. patent application Ser. No. 09/073,752 filed May 6, 1998, entitled "Method and Apparatus for Creating and Populating a Datamart" is hereby incorporated by reference.

BACKGROUND OF THE INVENTION

1. Field of the Invention

The present invention relates to a user interface and more particularly, to a user interface for database queries, where the relative positions of the selection criteria descriptions in the user interface determines how the selection criteria contribute to the selectivity of the queries.

2. Discussion of the Related Art

The prior art typically accesses a database for data employing a multitude of query applications by which a user defines selection criteria in the query interface. The query application typically uses Boolean logic to effectuate the particular selection criteria. The user often has to learn a different nomenclature for each of the query applications, as typically each performs their respective queries differently. This normally results in the user becoming frustrated and reluctant to use different query applications.

The conventional query applications have the selection criteria definitions inputted as text into the query application. Such a selection criteria text often includes expressions separated by Boolean operators and various syntactical constructs with, e.g., commas, parenthesis, etc. to effectuate the query. It is often difficult to apply the syntax properly to achieve the desired results. With a long selection criteria text the user either receives an error message due to improper syntax or receives a query result different than what was expected.

Furthermore, the prior art does not provide the user with information detailing the number of matches corresponding to the defined query prior to running the query. Therefore, the user must run the query without any information as to the efficacy of the present selection criteria. The lack of information as to the efficacy of the selection criteria text coupled with the inherent syntax problems that inevitably arise in defining the selection criteria have not been adequately addressed by the prior art.

What is desired is a user interface whereby the entry of selection criteria is performed in an intuitive manner.

SUMMARY OF THE INVENTION

Accordingly, the present invention is directed to a method or system that presents a user interface and formats queries that substantially obviates one or more of the problems due to limitations and disadvantages of the related art.

An object of the present invention is the provision of a user interface that accesses a database based upon the relative positions, in the user interface, of the selection criteria defined in the user interface.

Another object of the present invention is the provision of a user interface that provides the user with data corresponding to the number of matches in the database corresponding to the present selection criteria as it is being entered, thereby enhancing the efficacy of the initial and subsequent queries.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the user interface includes a method of defining in a computer system a subset of entries in a database, where the subset of entries is defined by a query. An interface is displayed having a number of criteria description locations. The criteria description locations are positioned in rows where each row has one or more columns. A criteria description is created in the interface that corresponds to criteria, where the criteria define a corresponding subset of the database. Importantly, the relative location of the criteria description in the user interface determines how the criteria contribute to the selectivity of the query.

The query is executed based upon the relative positions of the data entered into the user interface and provides the user with selection efficacy data as the criteria are defined through the user interface. Furthermore, the user does not have to learn a different nomenclature of the user interface or different syntax rules.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
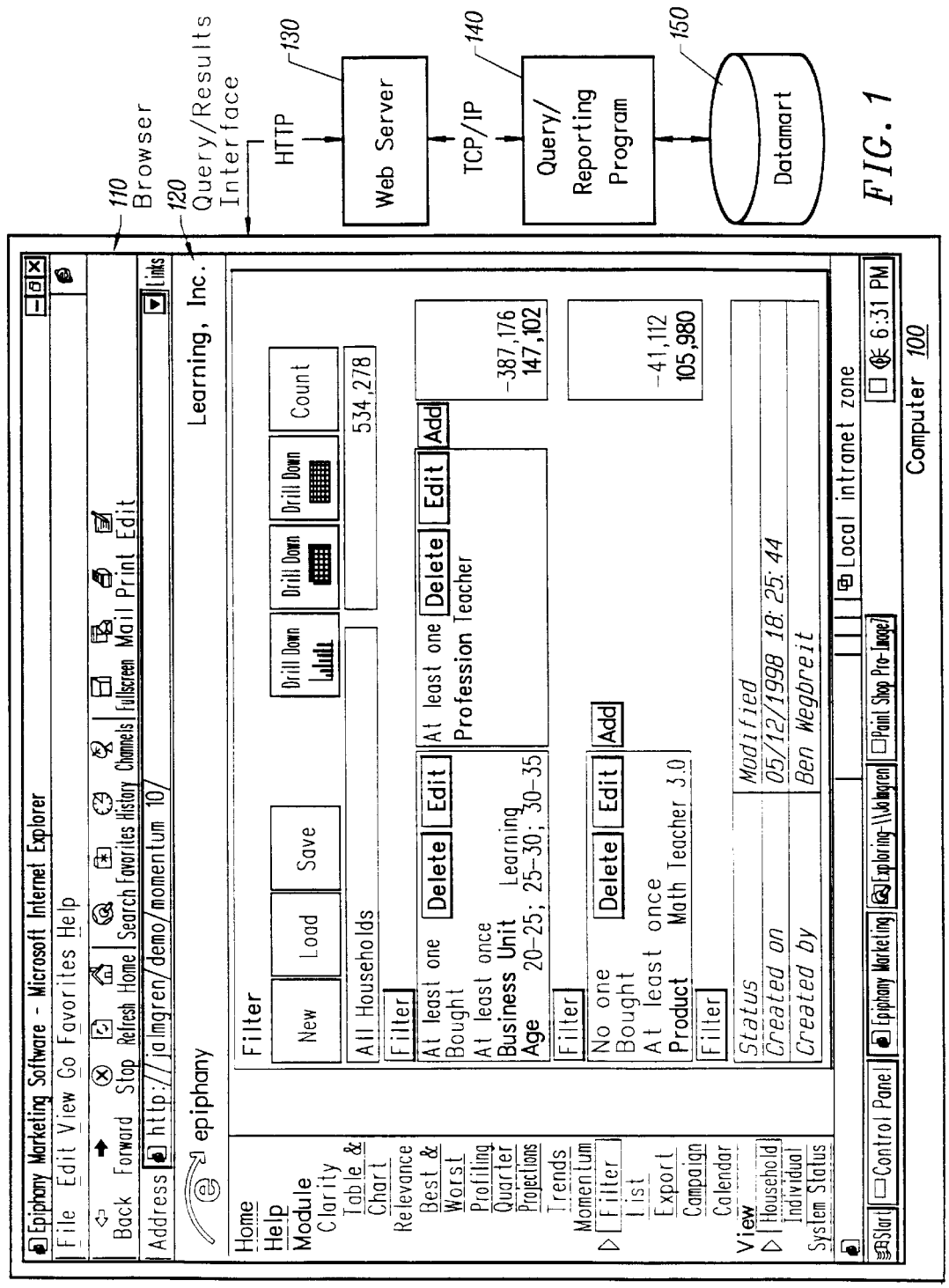
FIG. 1 illustrates a user interface query in communication with a web server and database.

FIG. 1 depicts a query/results interface 120 (user interface). The user interface 120, in communication with browser 110, is displayed on a general-purpose computer 100 or peripheral capable of displaying the user interface 120. The browser 110, such as the Netscape Communicator™ browser, generates the user interface 110 via Java, JavaScript or HTML. The browser 110, and therefore the user interface 120, via the computer 100, are also in communication with web server 130, query/reporting program 140, and datamart 150. In its most basic operation the user defines a query using the user interface 120. The browser 110, web server 130 and query/reporting program 140 act together to select from the datamart 150 for the requested data and present the results. The query can be expressed in conjunctive normal form like format.

A conjunctive normal form query is a Boolean expression that is defined from a number of AND'ed selection criteria, wherein the AND'ed selection criteria consist of a number of OR'ed selection criteria. It can be shown that any Boolean expression can be rewritten as a conjunctive normal form expression. The user interface 110 allows a user to more easily define the query by using the conjunctive normal form and the relative positioning of selection criteria descriptions to define whether an OR or an AND operation is performed between selection criteria. Importantly, the invention is not restricted to the conjunctive normal form queries. Where the term conjunctive normal form is used, it should be interpreted as meaning a Boolean logic like expression. This can include expressions where the terms include complex selection criteria (e.g., filter definitions). Also, different formats of the Boolean expression can be expressed, e.g., a combination of OR'ed selection criteria, where the selection criteria consist of a number of AND'ed selection criteria. Also, the expressions can optionally include NOT operators.

A computer 100 is any computing device (e.g., PC compatible, Unix workstation, etc.). Generally, a computer includes a processor and a memory. A computer can include a network of computers.

The web server 130 can be any type of web server such as an Apache web server, or a server available from Netscape Communications, Inc. or from Microsoft Corporation. The web server 130 generates the HTML and/or JavaScript for use by the browser 110. The web server 130 also transfers queries from the browser 110 to the query/reporting program 140.

The query/reporting 140 converts queries received from the web server 130 into queries for the datamart 150.

The datamart 150 is an example of a database. The interface 120 allows the user to define a query for the datamart 150.

The combination of the web server 130, the query/reporting program 140 and the datamart 150 allow users to make queries of the datamart 150 from almost any computer that can communicate with the web server 130. However, web based communication is not required. What is important is that there is a user interface where a user can define a query and there is some underlying data store that responds to the query. How the user interface is created or what makes up the underlying data store is not necessarily as important.

Figure 2:
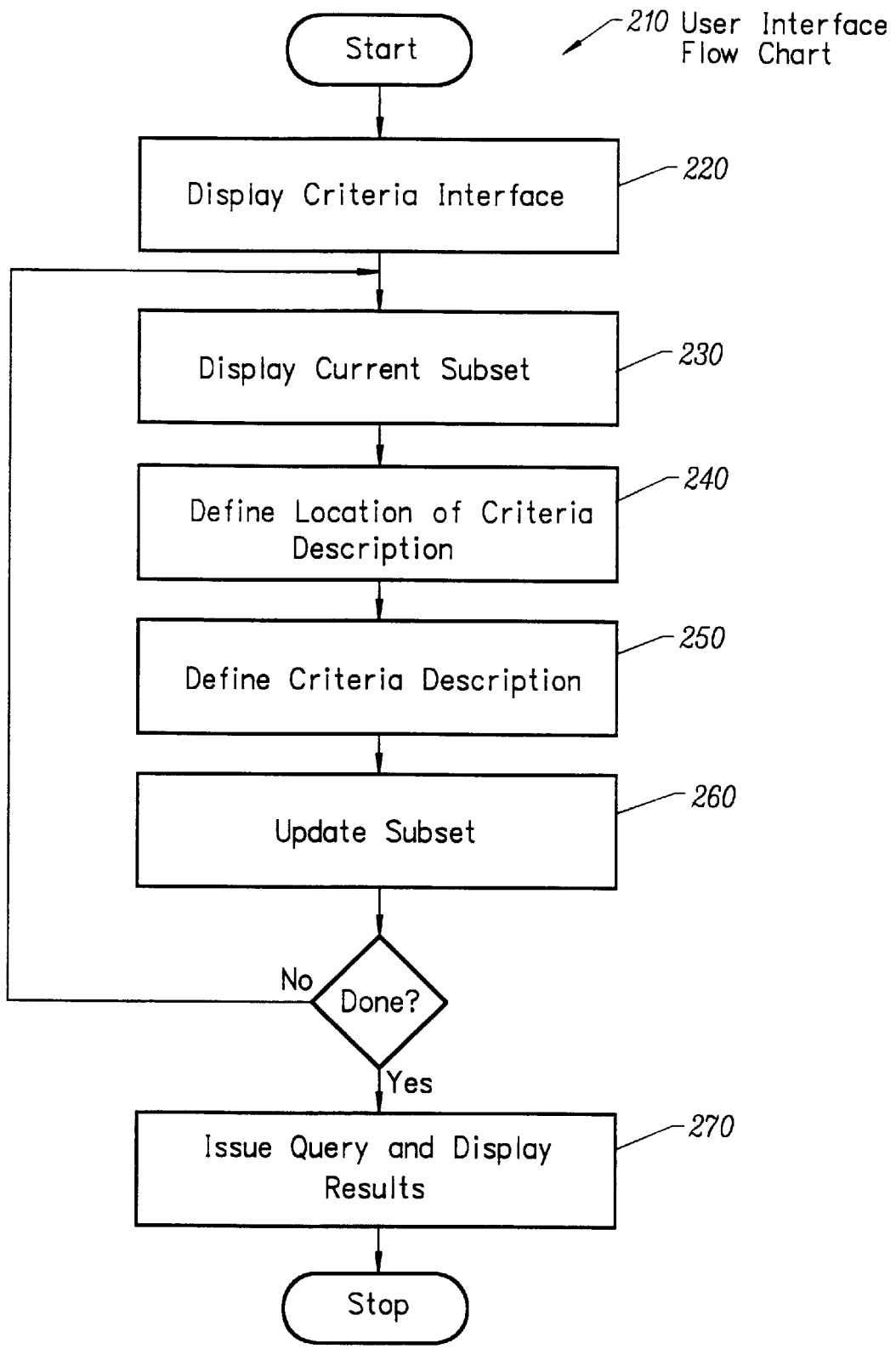
FIG. 2 displays a flow chart of the operation of the user interface.

FIG. 2 depicts a user interface flow chart 210 of the process used in performing the user query and selecting from the datamart 150. As the user enters selection criteria into the user interface the various processes represented by the flow chart 210 are executed and the desired information is presented to the user.

In navigating the user interface 120, a display criteria interface 220 step displays an interface for defining selection criteria for selecting a subset of the entries in the datamart 150.

Once a selection criteria has been selected, the user interface 110 proceeds to the display current subset 230 step and displays a number of matches encountered selecting from the datamart 150. A match represents an entry in the datamart 150 that fulfills the selection criteria. If no selection criteria is defined, then all the entries in the datamart 150 will be represented in the match count.

The define location of criteria description 240 step is then executed determining the position of any subsequent selection criteria. This can be done by the user determining where in the user interface 110 to define a new selection criteria (e.g., in a new row, or in a new column of an existing row).

The define criteria description 250 step is then performed. Here a user can define some type of selection criteria (e.g., define a filter, select a pre-existing subset of entries). Importantly, the location in the user interface 110 of the criteria description determines whether the new selection criteria can broaden or narrow the set of entries. Basically, selection criteria in the same row in the user interface 110 are logically OR'ed, while rows of selection criteria are logically AND'ed. The combination of the OR'ed and AND'ed selection criteria define the subset of entries in the datamart 150.

Thus, based upon the position of the selection criteria, and the selection criteria, the update subset 260 is then executed. This can involve determining the set of entries in the datamart 150 that fulfill the selection criteria.

At this point in the process, if the user has completed his or her query, the process proceeds to the issue query and display result step 270. Here the results of the query can be displayed. If the user desires to refine the present query, the process loops back to the display current subset step 230 and repeats the above-described process steps until the desired result is reached.

In the present invention, as shown in FIGS. 3–16, a user can add selection criteria to define a query for the datamart 150. Selection criteria that are defined in a single row are OR'ed, while rows of selection criteria are AND'ed.

Figure 3:
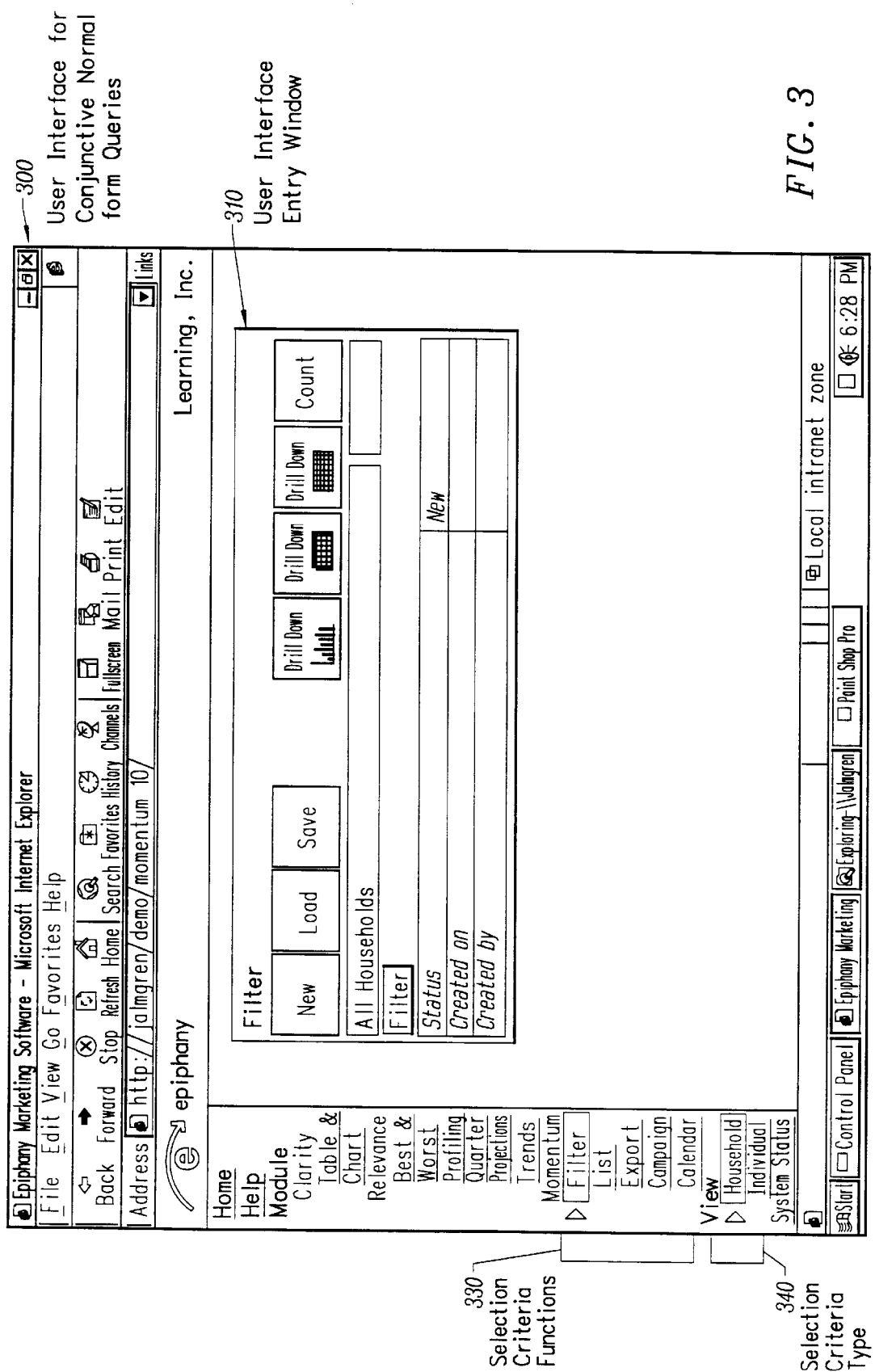
FIG. 3 illustrates the user interface without the selection of selection criteria.

FIG. 3 depicts a user interface for conjunctive normal form queries 300. The user enters selection criteria into user interface entry window 310, which is then executed by the user interface 120. The user interface entry window 310 provides the user with the capability to set selection criteria function 330 and selection criteria type 340. The selection criteria function 330 allows the user to switch between defining selection criteria and using a selection criteria in subsequent operations, such as creating a list based upon some selection criteria. The selection criteria type 340 allows the user to select what the criteria is applied to, such as "households," "individuals," or "companies." The selection criteria type options are limited by the type of data available in the datamart.

Figure 4:
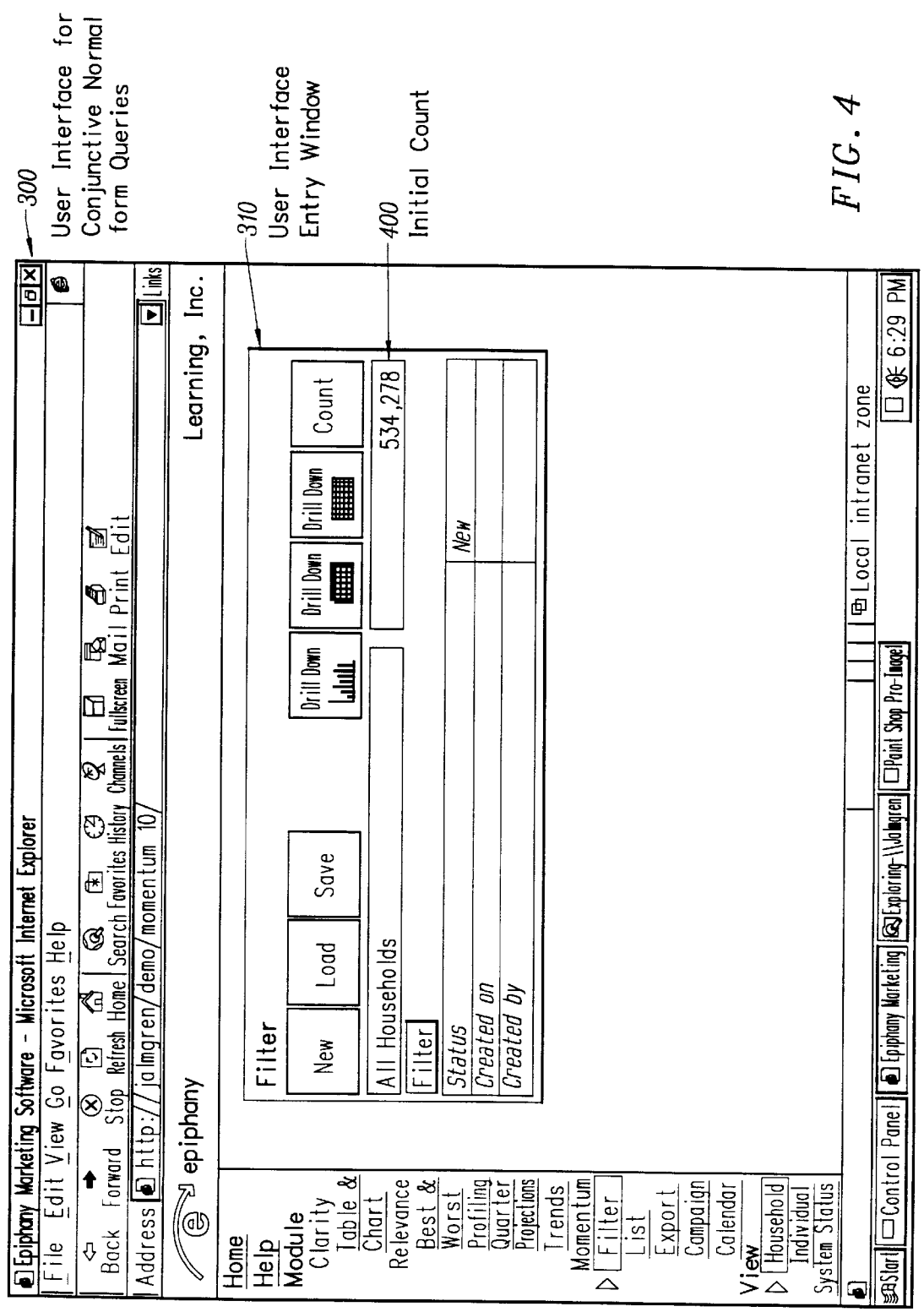
FIG. 4 illustrates the user interface depicting a match count without the selection of selection criteria.

FIG. 4 depicts the user interface entry window 310, wherein a selection criteria has been entered, and the total number of matches 400 (initial count) that the user interface encountered selecting from the datamart 150. The initial count 400 is determined by extrapolating from a statistical significant portion of the entire database the projected number of matches encountered for the present query. The initial count 400 provides the user with an approximation of the known universe as contained by the datamart 150 for the initial selection criteria. The initial count 400 provides the user with a starting reference point by which subsequent queries can be evaluated. In some embodiments, the initial count 400 can be the actual count of the matches.

Figure 5:
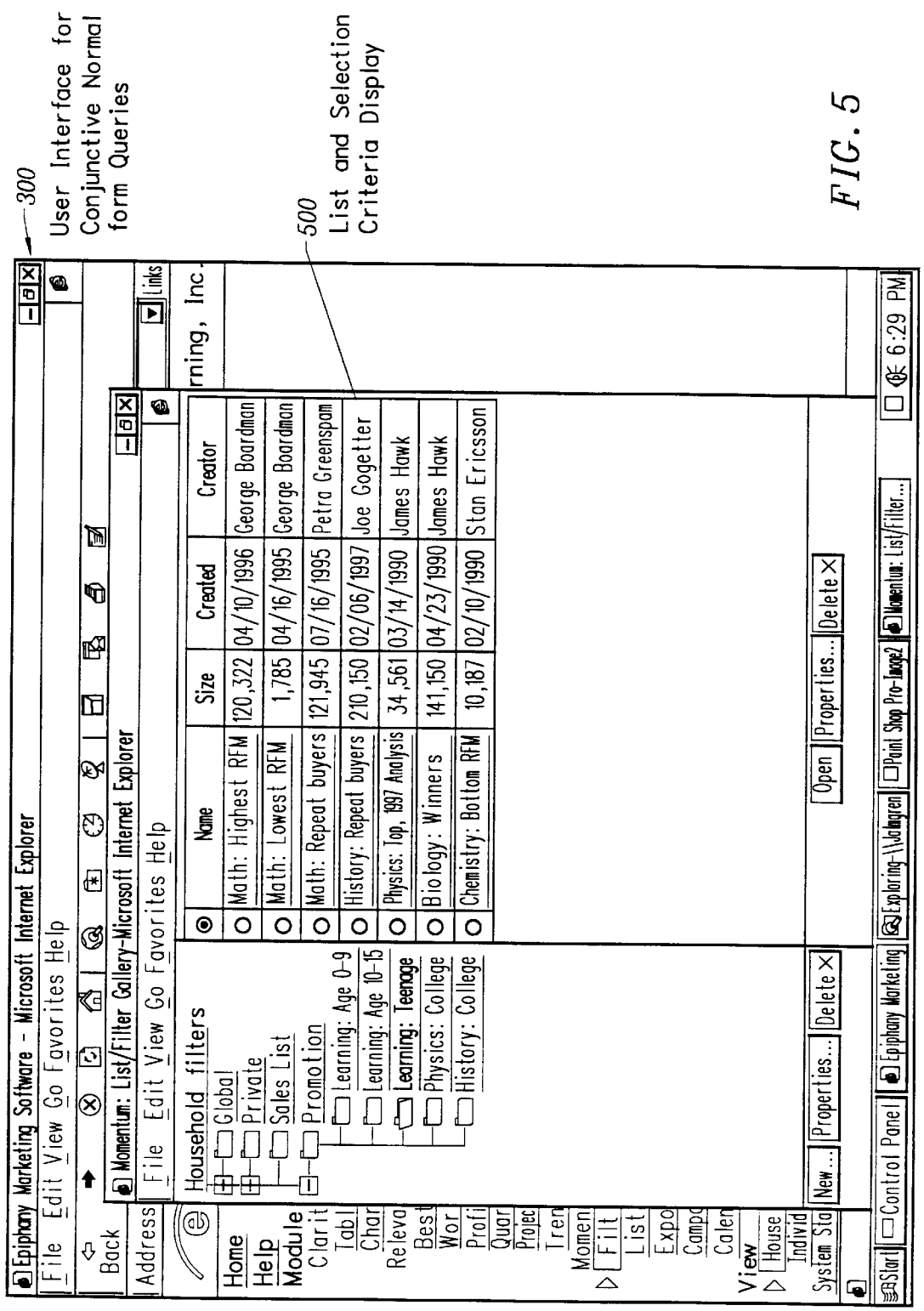
FIG. 5 illustrates loading a predetermined selection criteria in the user interface.

FIG. 5 depicts a list and selection criteria display 500, wherein the selection criteria display 500 (it is also referred to as a list or a filter) represents previously determined selection criteria. The list or selection criteria display 500 displays a list of selection criteria that were previously created to model a specific situation. The user may select and use the selection criteria from the display 500 as is or may modify the selection criteria to achieve the users desired objective.

Figure 6:
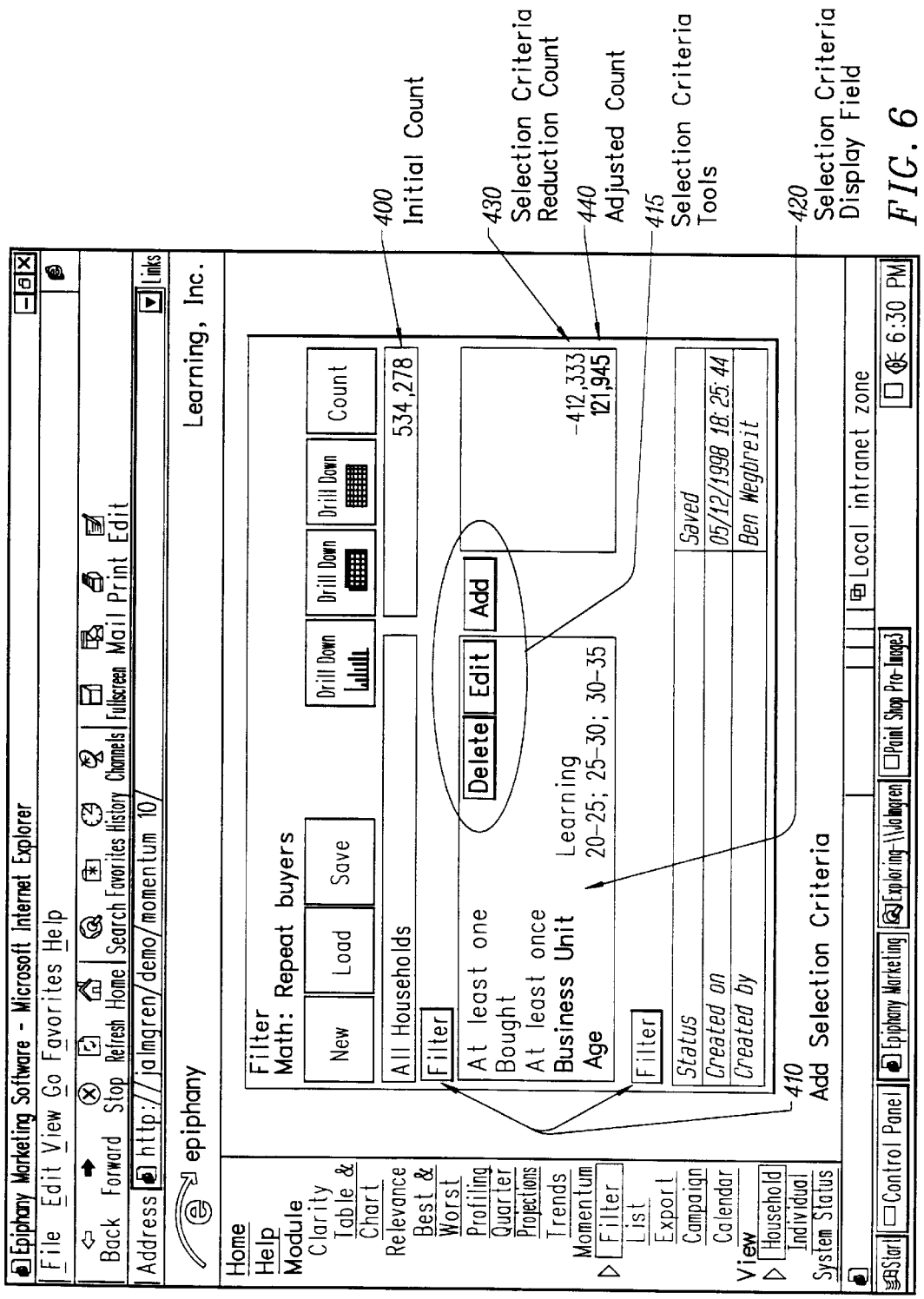
FIG. 6 illustrates the user interface with the predetermined selection criteria loaded into the user interface and displaying the number of matches generated by the selection criteria.

FIG. 6 depicts the current state of user interface entry window 310 and graphically the query to be executed by the user interface 120. The user selecting add selection criteria button 410 adds a criteria in a new row. The user interface entry window 310 includes selection criteria tools 415 for modifying criteria and adding new criteria to an existing row. The "filter" button narrows the criteria while the "add" button widens the criteria.

Selection criteria reduction count 430 (reduction count) depicts the reduction in the number of matches encountered in the datamart 150 based upon the present query. It should be noted that the query has not been run at this point in time, but the reduction count 430 represents an approximation of the true count as explained above. Adjusted count 440 represents the number of matches remaining after the reduction count 430 is subtracted from the initial count 400.

Figure 7:
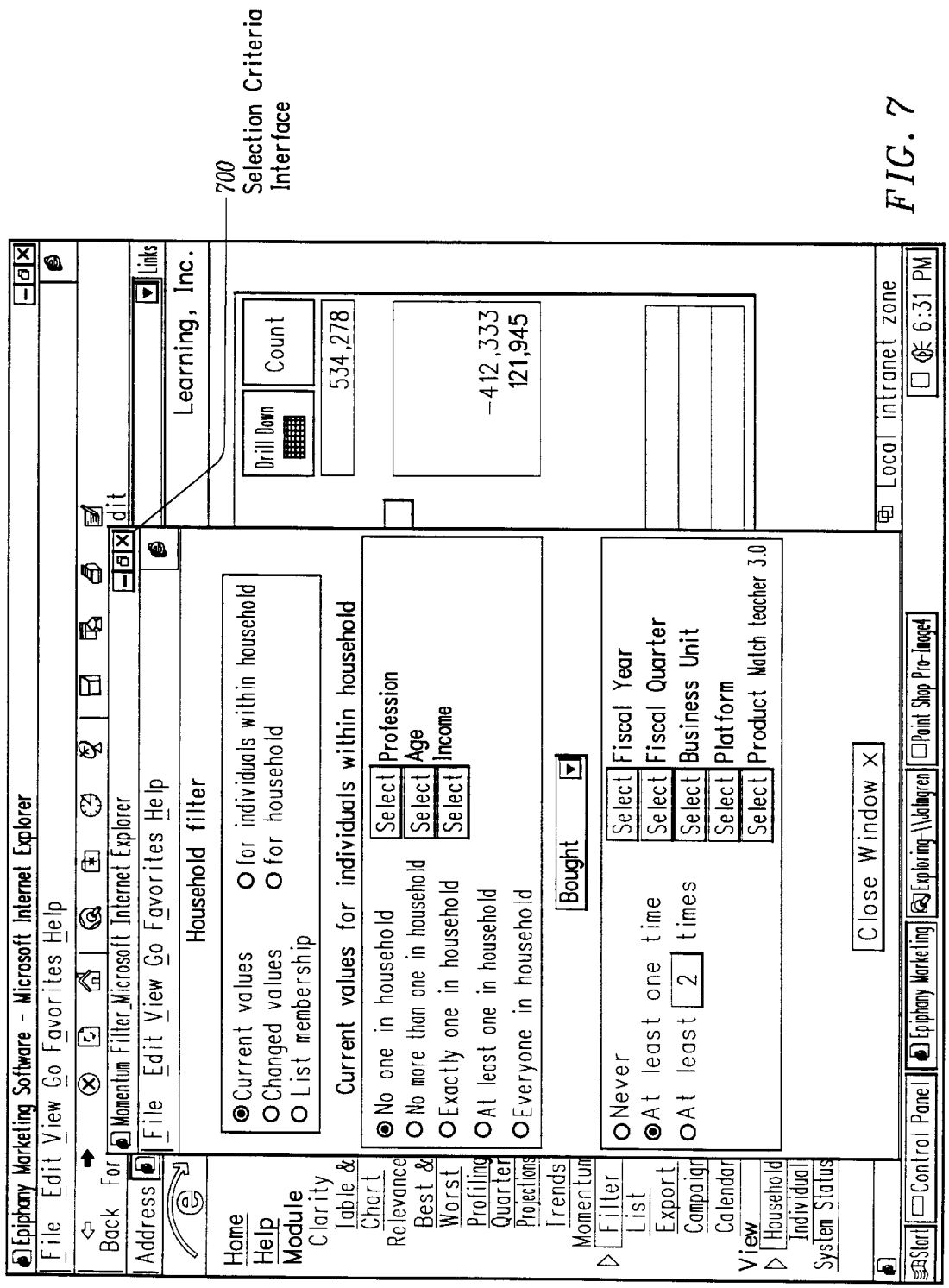
FIG. 7 illustrates new selection criteria descriptions that were added to the selection criteria displayed in FIG. 6, and hence produce FIG. 8.

FIG. 7 displays a selection criteria interface 700 from which the user may select selection criteria to be added to the query. Once the user has completed his/her selection from the selection criteria interface 700, control is transferred back to the user interface entry window 310 and updates the data. The selection criteria display field 420 displays the selection criteria entered into the entry window 310 via the selection criteria interface 700, as shown in FIG. 7.

Figure 8:
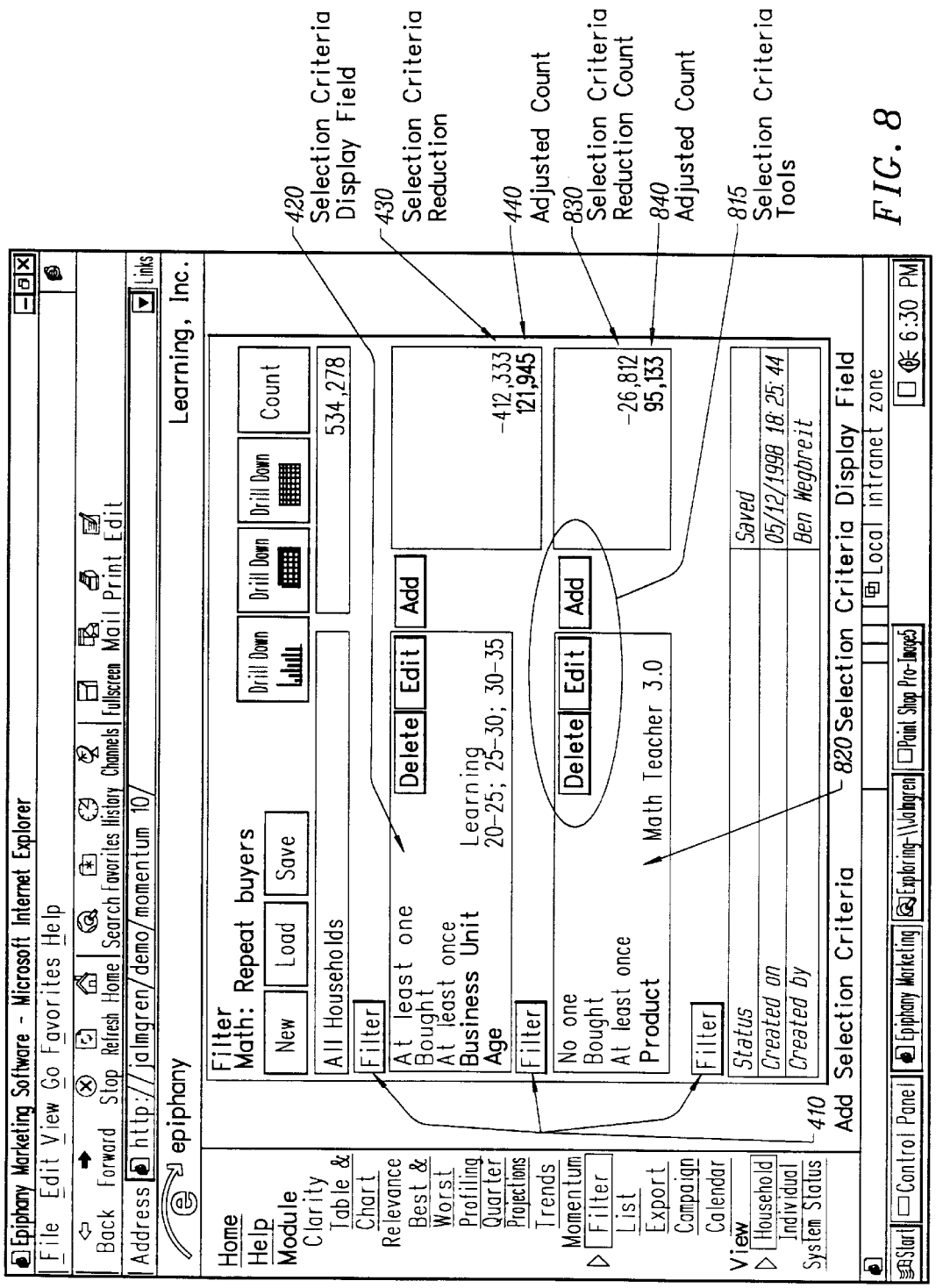
FIG. 8 illustrates the change in the number of the matches, with the addition of the selection criteria from FIG. 7, from the matches displayed in FIG. 6.
Figure 9:
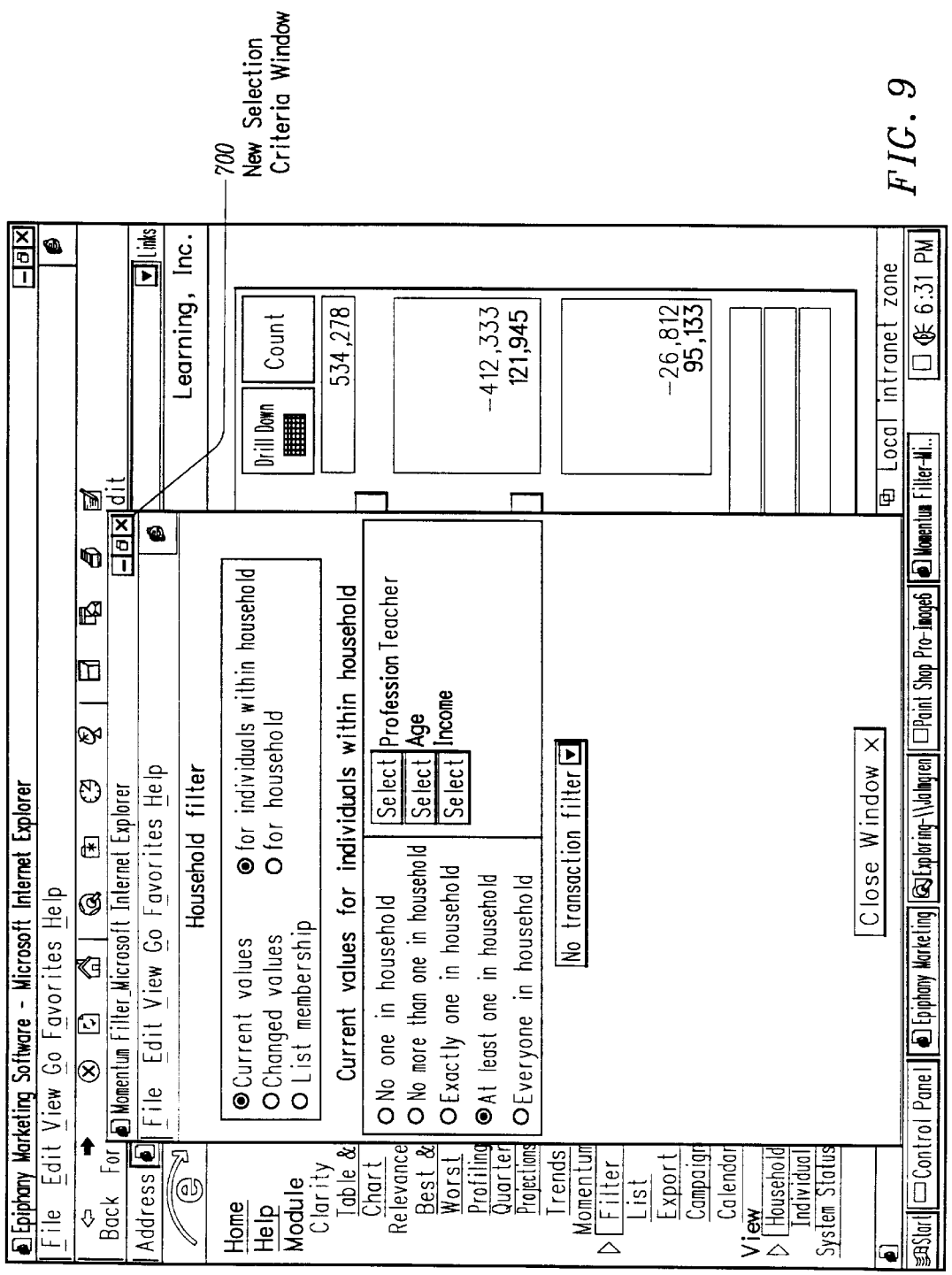
FIG. 9 illustrates new selection criteria descriptions that were added to the selection criteria displayed in FIG. 8.

Each time the add selection criteria button 410 is entered by the user, a similar process is executed, as shown in FIG. 8, and any additional selection criteria is AND'ed to the previously projected result. Additionally, a selection criteria display field 820 is added to the user interface entry window 310 as well as a selection reduction count 830 and an adjusted count 840, which indicates the effect of the new selection criteria will have on the previously proposed query. In the present example, each query added via the add selection criteria button 410 creates a new row and AND's the new selection query to the previous obtained results. This process continues until the user has entered in all of the selection criteria desired to meet their objective.

Figure 10:
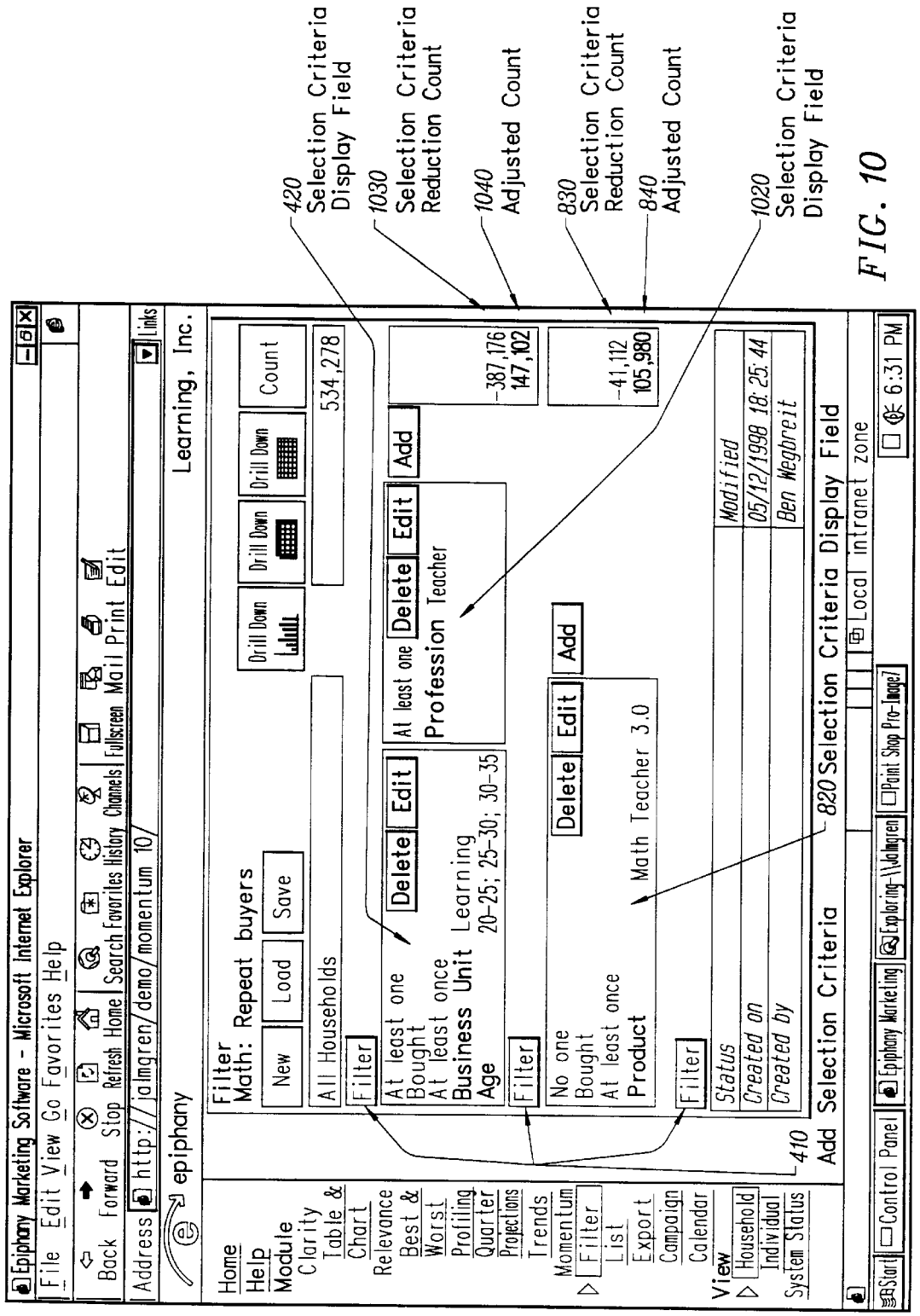
FIG. 10 illustrates the change in the number of the matches, with the addition of the selection criteria from FIG. 7, from the matches displayed in FIG. 8.

If the user selects the add button in the selection criteria tools 815, the selection criteria interface, as depicted in FIG. 7, is presented to the user. The user makes selections from new selection criteria window 700 and upon completion of the selection process is return to the interface entry window 310, as depicted in FIG. 10. As shown in FIG. 10, the selection criteria is displayed in a selection criteria display field 1020. In the example illustrated in FIG. 10 the profession of Teacher was selected as the selection criteria to run the query against. The new selection criteria result in selection criteria reduction count 1030 and adjusted count 1040 to be updated.

Each time the add button is selected from the selection criteria tools 815, a similar process is executed, as shown in FIG. 10, and any additional selection criteria is OR'ed to the other criteria in the same row. This process introduces a new column to each row it is performed on and can be administered to each subsequent row as many times is necessary to achieve the user's desired objective.

Simply stated, the addition of each of subsequent selection criteria to each row creates a new column and OR's the new selection criteria to the other criteria in the same row. Each addition of a subsequent selection criteria in a new row AND's the selection criteria to the previous projected results. Therefore, columns created from left to right on the user interface window 310 graphically represent OR'ing the selection criteria for column of that respective row and each row entered from top to bottom graphically represents AND'ing of each subsequent selection criteria to the previous projected results.

Although the present invention has been described with OR'ing from left to right and AND'ing from top to bottom graphically in the user interface window 310, it should be noted that AND'ing from left to right via entering new columns per row and OR'ing from top to bottom via entering new rows has been contemplated and is supported by the present invention.

Figure 11:
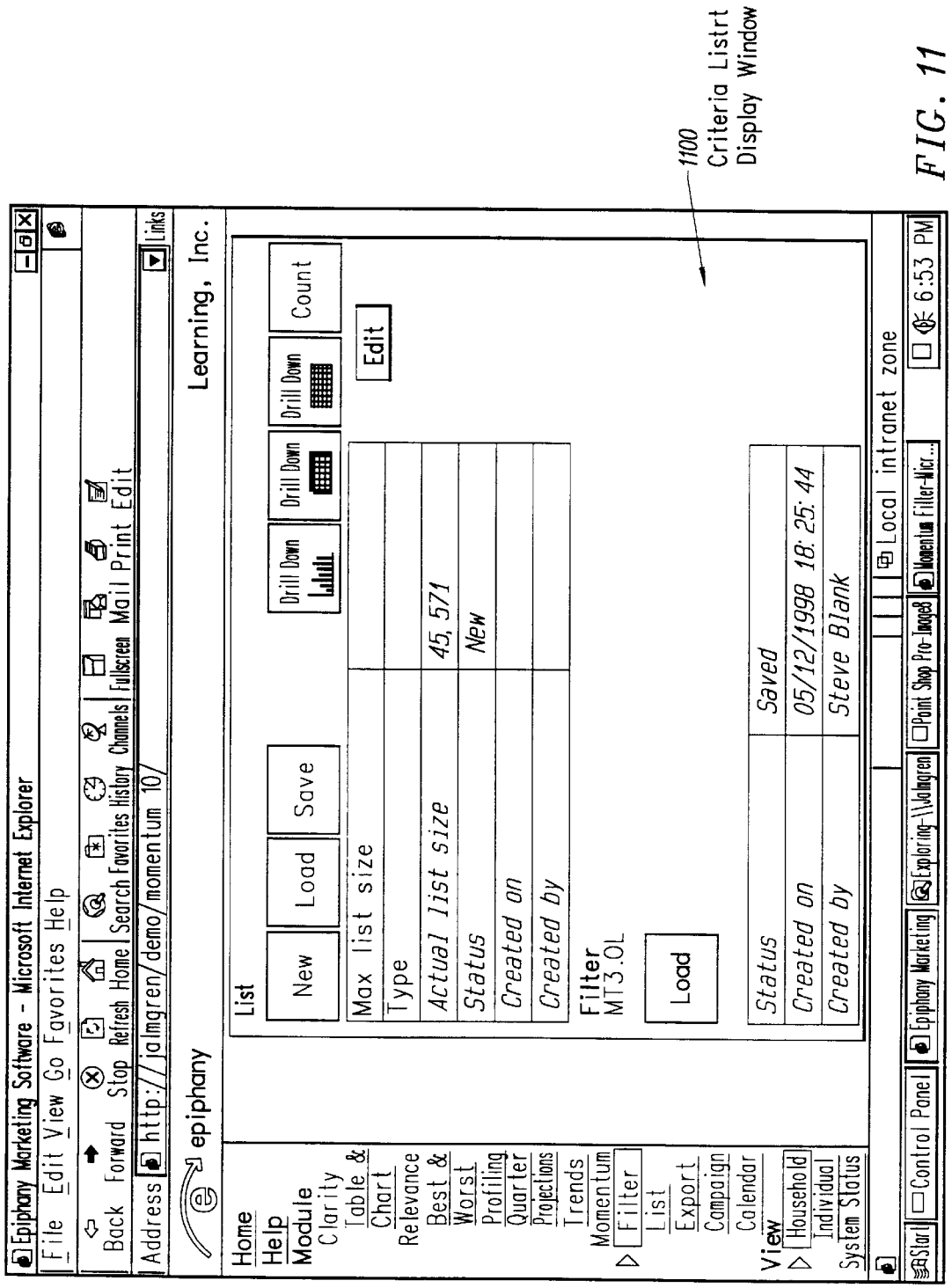
FIG. 11 illustrates list data associated with the selection criteria of FIG. 10.
Figure 12:
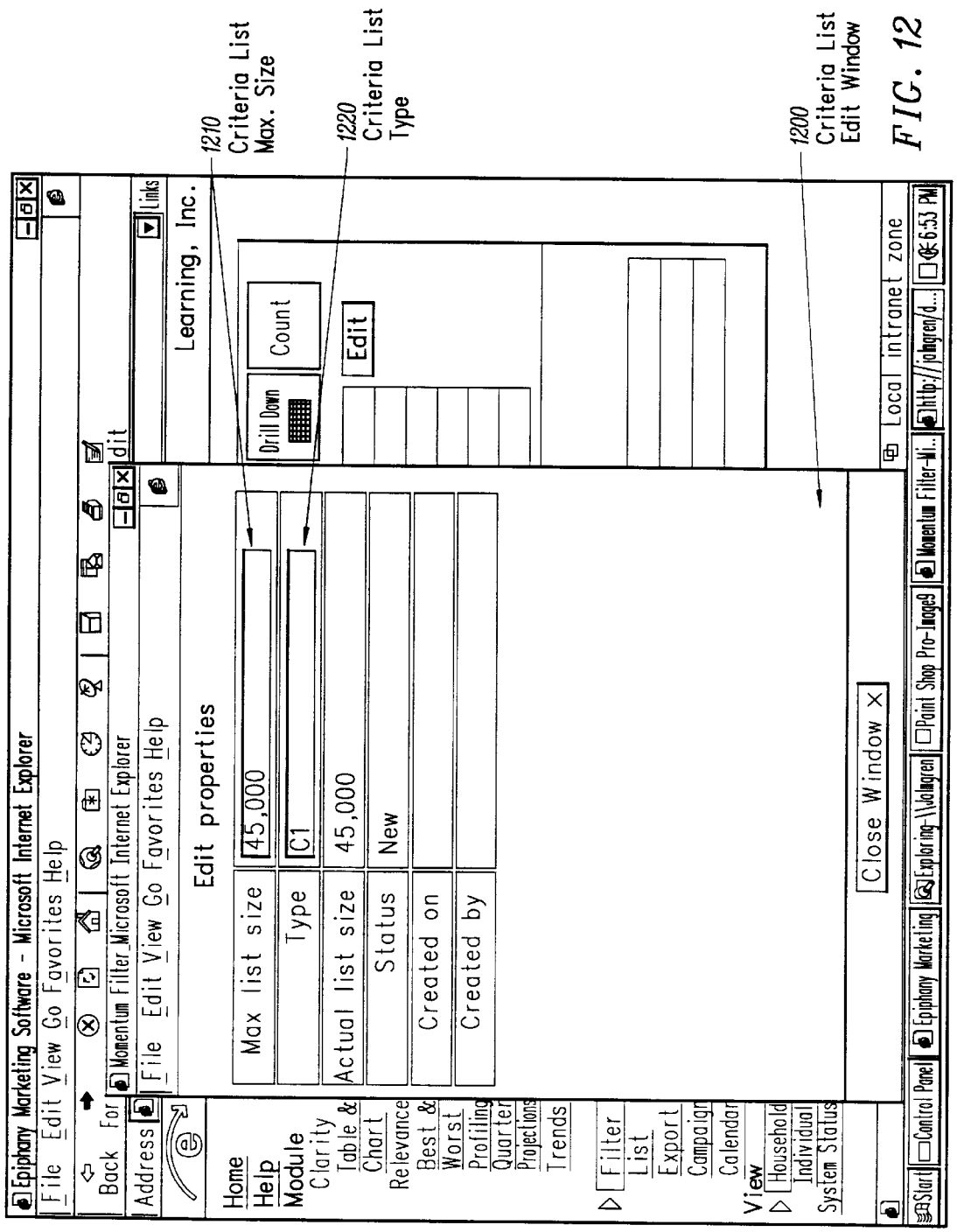
FIG. 12 illustrates list data properties associated with the selection criteria of FIG. 10.

As depicted in FIGS. 11 and 12, the present embodiment of the invention provides the user with the ability to save the created query. In FIG. 11 a criteria list display window 1100 provides the user with a display representing the current query. For instance, the criteria list display window 1100 indicates that criteria list (indicate as a filter in the display window 1100) named MT3.0 is new with an actual list size of 45,571. FIG. 12 discloses a criteria list edit window 1200, whereby a max. list size 1210 has been entered to cap the number of matches allowed by the query. In this example the maximum list size is set to 45,000 which are then saved, i.e. tagged, for future reference. Also a criteria list type 1220 is provided, to allow the user to organize criteria list into groups, departments, types, etc.

Figure 13:
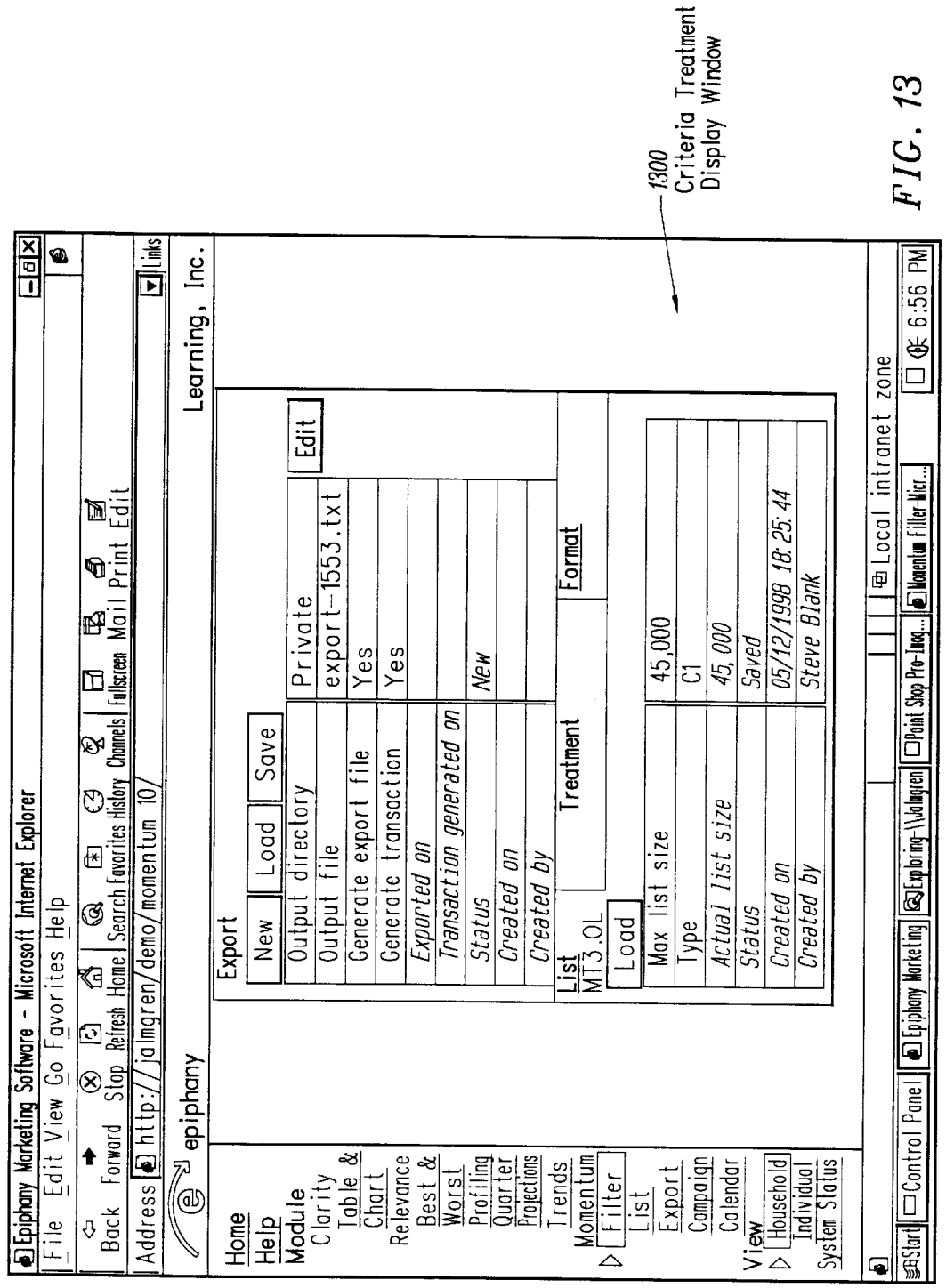
FIG. 13 illustrates export data properties selected for the selection criteria of FIG. 10.
Figure 14:
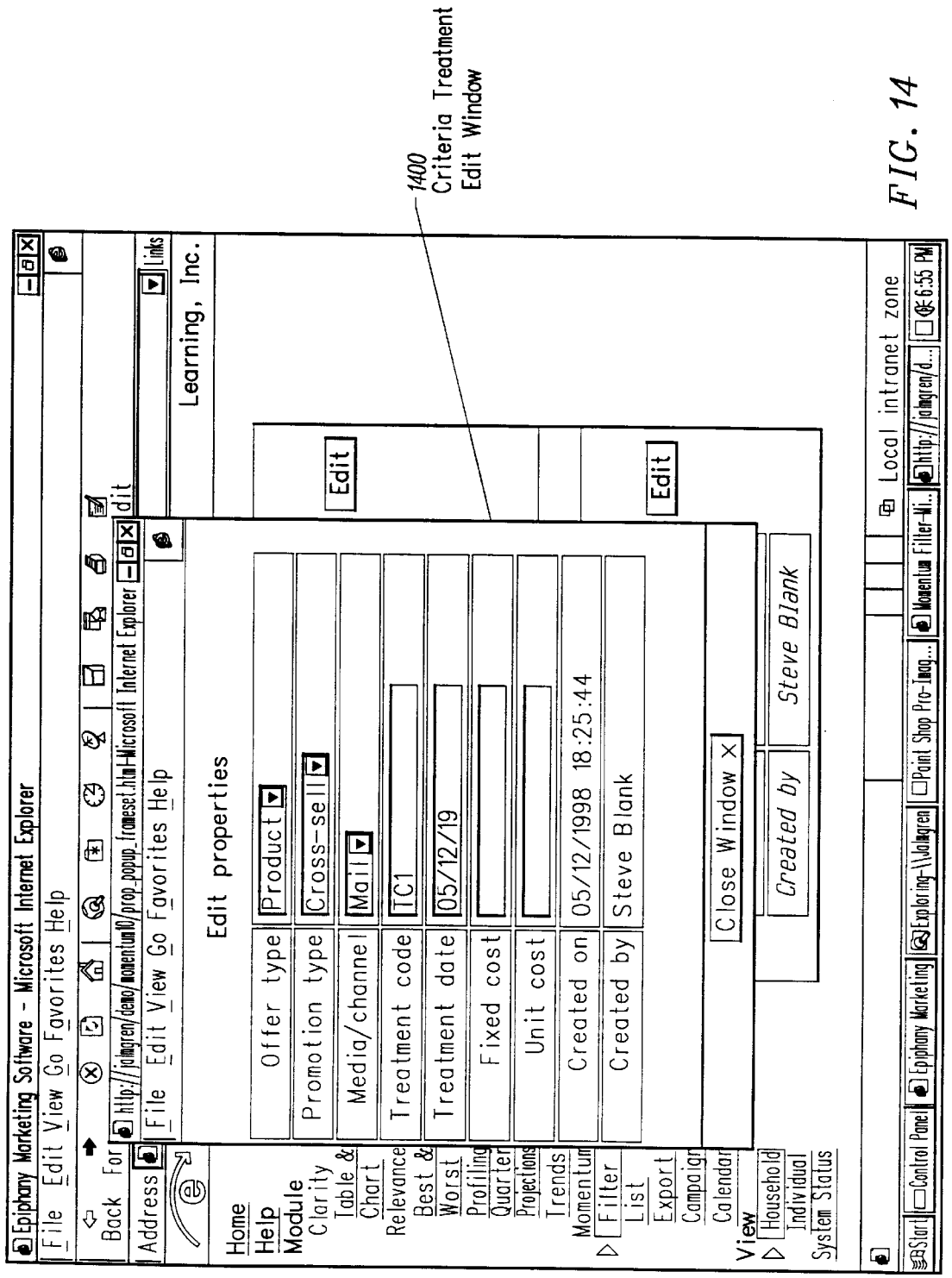
FIG. 14 illustrates an export data list table associated with the selection criteria of FIG. 10.

FIGS. 13 and 14 disclose a criteria treatment display window 1300 and criteria treatment edit window 1400, respectively. The display window 1300 and edit window 1400 provides the user with substantially the same type of functionality with respect to the treatment of the list criteria created and modified as shown in FIGS. 11 and 12, respectively. For example, FIG. 13 discloses that criteria list MT3.0 is private and is a general export file and FIG. 14 displays some of the fields that may be employed to limit access to a provide functionality to the criteria list.

Figure 15:
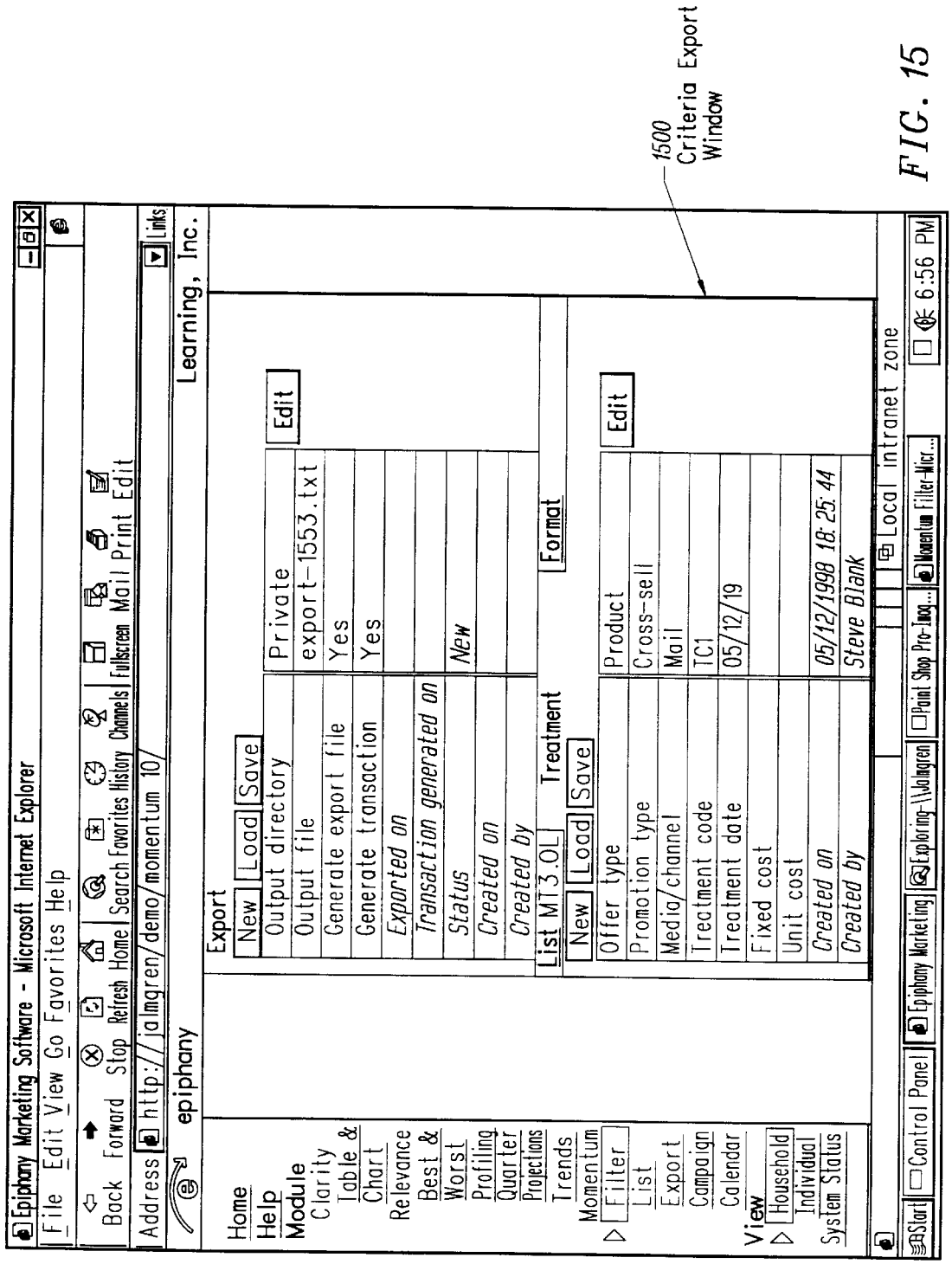
FIG. 15 illustrates and export treatment table associated with the selection criteria of FIG. 10.
Figure 16:
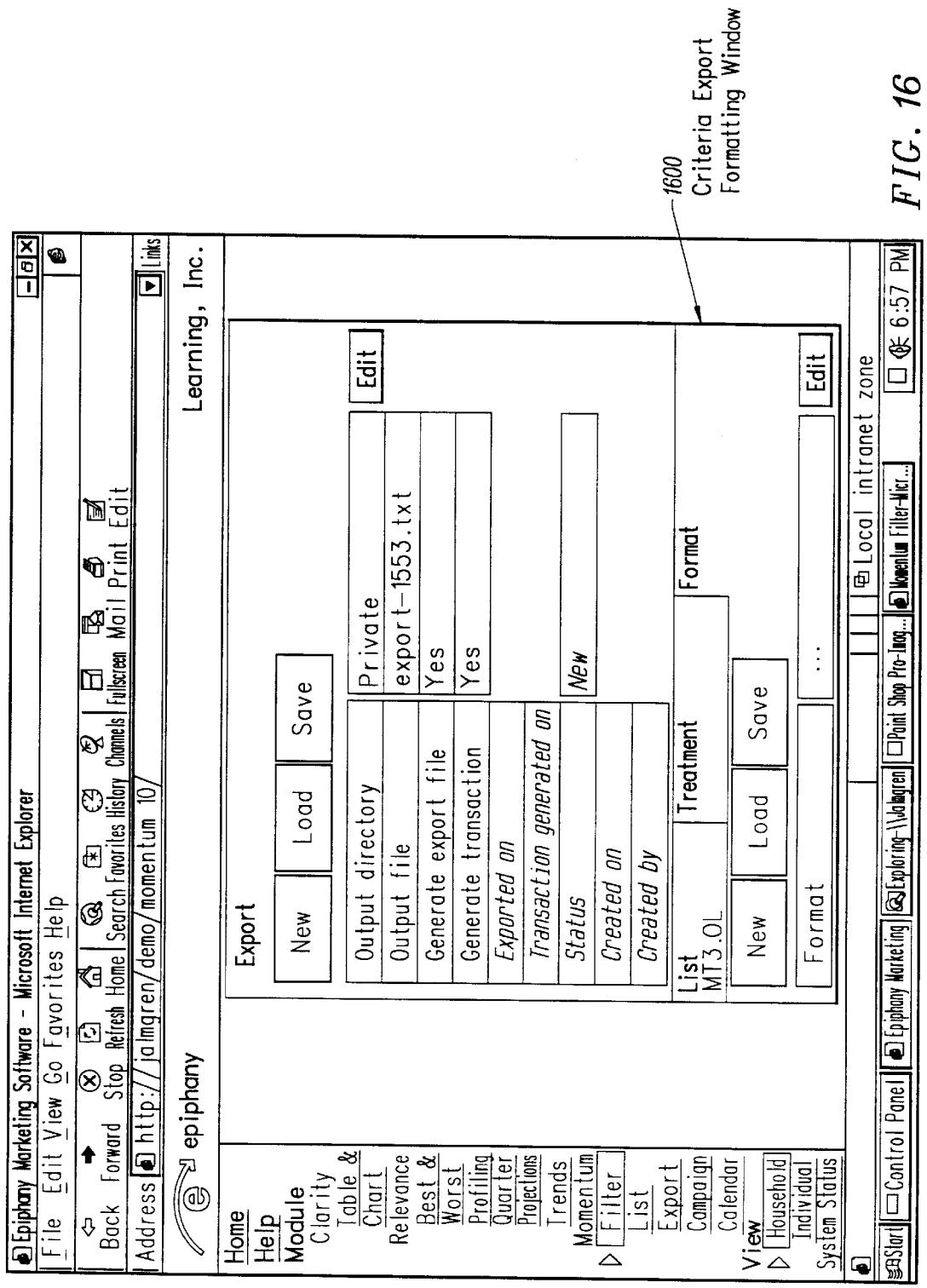
FIG. 16 illustrates the completion of exporting of the data associated with the selection criteria of FIG. 10.

FIGS. 15 and 16 display criteria export and criteria export formatting information to the user.

Although the above description has been directed to an HTML query interface, the interface can be used in other database applications. Examples of such applications include Microsoft Access, FileMaker Pro, proprietary database interfaces (e.g., it can be employed to search legal case law or other proprietary data). The interface can be used in other areas, such as in spreadsheet applications (e.g., Microsoft Excel), query applications, full text search applications, search engines (e.g., Yahoo, the IBM Patent Server) and any other application that needs some way of easily defining a database query or any combination of OR and AND operations.

Some embodiments of the invention include only the programs needed to generate the user interface. These programs can be stored on computer readable media or can be transmitted via electromagnetic waves. The programs can be part of a library of user interface programs for generating queries (e.g., as may be found in Microsoft Visual Basic).

Various embodiments of the invention can be included in different physical elements. For example, some embodiments of the invention can be included as a program on a computer readable media (e.g., a hard disk, a CD-ROM, a floppy disk, a Zip disk, a Jaz disk, or any other type of media that can store a computer program). Other embodiments of the invention can include a program included in an electromagnetic wave (e.g., a program in a series of packets from a server where the packets are transmitted via an electrical signal from the server, or any other type of electromagnetic signal capable of transmitting a data signal).

In some embodiments of the invention, the user interface supports nested conjunctive normal form like queries. In these embodiments, a selection criteria description can reference another (nested) conjunctive normal form query. The user interface for the single level conjunctive normal form query can be reused for defining the referenced query. Alternatively, the single level user interface can be modified to support nested rows and columns, hence supporting the nested conjunctive normal form query. To use the single level interface, for example, the user could double-click on a selection criteria description, which result in another single level interface being opened on the referenced query.

It will be apparent to those skilled in the art that various modifications and variations can be made in the user interface of the present invention without departing from the spirit or scope of the invention. Thus, it is intended that the present invention covers the modifications and variations of this invention provided they come within the scope of the appended claims and their equivalents.

What is claimed is:

1. A method of defining a subset of entries in an electronic database comprising:
    providing an interface including a number of criteria description locations positioned in rows where each row has at least one column; and
    creating a criteria description in the interface that corresponds to a criteria, wherein the criteria defines a corresponding subset of the database, wherein a first logical operation is performed among the criteria of a same row and a second logical operation is performed among rows of the criteria so that the relative location of the criteria description in the user interface determines how the criteria contributes to the selectivity of a query.

2. The method of claim 1 wherein entry of a new criteria description in a new column of an existing row is capable of broadening the selectivity of the query, and wherein entry of the new criteria description in a new row is capable of narrowing the selectivity of the query.

3. The method of claim 1 wherein entry of a new criteria description in a new row of an existing column is capable of broadening the selectivity of the query, and wherein entry of the new criteria description in a new column is capable of narrowing the selectivity of the query.

4. The method of claim 1 wherein entry of a new criteria description in a new column of an existing row is capable of narrowing the selectivity of the query, and wherein entry of the new criteria description in a new row is capable of broadening the selectivity of the query.

5. The method of claim 1 wherein entry of a new criteria description in a new row of an existing column is capable of narrowing the selectivity of the query, and wherein entry of the new criteria description in a new column is capable of broadening the selectivity of the query.

6. The method of claim 1, wherein a subset count is determined and displayed, wherein the subset count corresponds to the number of entries in the subset.

7. The method of claim 6, wherein the subset count is determined from a statistical approximation of the number of entries in the subset.

8. The method of claim 6, wherein the subset count represents the exact number of entries in the subset.

9. The method of claim 1 wherein a first row of the rows includes a first set of criteria descriptions, wherein the first set of criteria descriptions corresponds to a first set of criteria, wherein each criteria description in the first set of criteria descriptions has a corresponding criteria of the first set of criteria, wherein each criteria in the first set of criteria contributes to the selectivity of the query, wherein the first set of criteria defines a first subset of entries in the database, and wherein the user interface displays the number of entries in the first subset.

10. The method of claim 9 wherein a second row of the rows includes a second set of criteria descriptions, wherein the second set of criteria descriptions corresponds to a second set of criteria, wherein each criteria description in the second set of criteria descriptions has a corresponding criteria of the second set of criteria, wherein each criteria in the second set of criteria contributes to the selectivity of the query, wherein the second set of criteria defines a second subset of entries in the database, wherein the first subset and the second subset are used to generate a third subset, and wherein the user interface displays the number of entries in the third subset.

11. The method of claim 10 wherein the third subset is the intersection of the first subset and the second subset.

12. The method of claim 10 wherein the third subset is the union of the first subset and the second subset.

13. The method of claim 1 wherein a first column of the columns includes a first set of criteria descriptions, wherein the first set of criteria descriptions corresponds to a first set of criteria, wherein each criteria description in the first set of criteria descriptions has a corresponding criteria of the first set of criteria, wherein each criteria in the first set of criteria contributes to the selectivity of the query, wherein the first set of criteria defines a first subset of entries in the database, and wherein the user interface displays the number of entries in the first subset.

14. The method of claim 13 wherein a second column of the columns includes a second set of criteria descriptions, wherein the second set of criteria descriptions corresponds to a second set of criteria, wherein each criteria description in the second set of criteria descriptions has a corresponding criteria of the second set of criteria, wherein each criteria in the second set of criteria contributes to the selectivity of the query, wherein the second set of criteria defines a second subset of entries in the database, wherein the first subset and the second subset are used to generate a third subset, and wherein the user interface displays the number of entries in the third subset.

15. The method of claim 14 wherein the third subset is the intersection of the first subset and the second subset.

16. The method of claim 14 wherein the third subset is the union of the first subset and the second subset.

17. A method of displaying a subset of entries in a database, comprising:

providing an interface including a number of criteria description locations positioned in rows where each row has at least one column; and creating a criteria description in the interface that corresponds to a criteria, wherein the criteria defines a corresponding subset of the database, wherein a first logical operation is performed among the criteria of a same row and a second logical operation is performed among rows of the criteria so that the relative location of the criteria description in the user interface determines how the criteria contributes to the selectivity of a query;

issuing the query; and displaying results corresponding to the query wherein the results correspond to a subset of entries.

18. The method of claim 17 wherein entry of a new criteria description in a new column of an existing row is capable of broadening the selectivity of the query, and wherein entry of the new criteria description in a new row is capable of narrowing the selectivity of the query.

19. The method of claim 17 wherein entry of a new criteria description in a new row of an existing column is capable of broadening the selectivity of the query, and wherein entry of the new criteria description in a new column is capable of narrowing the selectivity of the query.

20. The method of claim 17 wherein the criteria includes a filter, and wherein the filter specifies some of the parameters to which the subset of entries conforms.

21. The method of claim 17 wherein the criteria includes a previously defined subset of entries in the database.

22. A computer program product, comprising:

a memory medium; and a computer program stored on the memory medium, the computer program comprising instructions for generating a user interface, the user interface including a plurality of criteria description locations positioned in a plurality of rows where each row of the plurality of rows includes at least one column, the user interface allowing a placement of a set of criteria descriptions in the plurality of criteria description locations, wherein each criteria description contributes to the definition of a query through a corresponding criteria, wherein a first logical operation is performed among the criteria of a same row and a second logical operation is performed among rows of the criteria so that the relative location of each criteria description determines how the corresponding criteria contributes to the query.

23. A system for displaying a subset of entries in a database, comprising:

a means for displaying an interface including a number of criteria description locations positioned in rows where each row has at least one column; and a means for placing a criteria description in the interface that corresponds to a criteria, wherein the criteria defines a corresponding subset of the database, wherein a first logical operation is performed among the criteria of a same row and a second logical operation is performed among rows of the criteria so that the relative location of the criteria description in the user interface determines how the criteria contributes to the selectivity of a query.

24. The method of claim 1, wherein the second logical operation is a logical OR operation.

25. A computer readable medium containing executable instructions which, when executed in a processing system, causes the system to define a subset of entries in a database using a query, the defining comprising:

providing an interface including a number of criteria description locations positioned in rows where each row has at least one column;

creating a criteria description in the interface that corresponds to a criteria, wherein the criteria defines a corresponding subset of the database, wherein a first logical operation is performed among the criteria of a same row and a second logical operation is performed among rows of the criteria so that the relative location of the criteria description in the user interface determines how the criteria contributes to the selectivity of a query;

issuing the query; and displaying results corresponding to the query wherein the results correspond to a subset of entries.

26. An electromagnetic medium containing executable instructions which, when executed in a processing system, causes the system to define a subset of entries in a database using a query, the defining comprising:

providing an interface including a number of criteria description locations positioned in rows where each row has at least one column;

creating a criteria description in the interface that corresponds to a criteria, wherein the criteria defines a corresponding subset of the database, wherein a first logical operation is performed among the criteria of a same row and a second logical operation is performed among rows of the criteria so that the relative location of the criteria description in the user interface determines how the criteria contributes to the selectivity of a query;

issuing the query; and displaying results corresponding to the query wherein the results correspond to a subset of entries.

27. The method of claim 1, wherein the first logical operation is a logical OR operation.

28. The method of claim 1, wherein the second logical operation is a logical AND operation.

29. The method of claim 1, wherein the first logical operation is a logical AND operation.

* * * * *